July 19, 1927.

H. FÖTTINGER 1,636,050

DEVICE FOR DAMPING THE OSCILLATIONS OF MULTIPLE CRANK SHAFTS

Filed June 24, 1920

Inventor

Hermann Föttinger
By Julian C Dowell
his attorney.

Patented July 19, 1927.

UNITED STATES PATENT OFFICE

1,636,050

HERMANN FÖTTINGER, OF ZOPPOT, NEAR DANZIG, FREE CITY OF DANZIG.

DEVICE FOR DAMPING THE OSCILLATIONS OF MULTIPLE CRANK SHAFTS.

Application filed June 24, 1920, Serial No. 391,518, and in Germany February 8, 1915.

(GRANTED UNDER THE PROVISIONS OF THE ACT OF MARCH 3, 1921, 41 STAT. L., 1313.)

The invention relates to means and arrangements for damping or suppressing the oscillations which generally arise in long shafts having a number of cranks.

As it is known, the multiple crank shafts of high speed gas and oil engines having a variable number of revolutions, are subject to numerous and extraordinarily powerful oscillations, particularly torsional oscillations, which, at certain numbers of revolution, give rise to dangerous resonance effect, and lead even sometimes to fracture of the shaft. Where owing to the limited space, as in torpedo and submarine craft, it is necessary to use a large number of small cylinders and cranks, the said occurrence will put a limit to the number of the cylinders that can be safely employed.

The object of the invention is to provide means for damping or avoiding the said oscillations and the manner of employing or combining same with the crank shafts of gas or oil engines.

This object is attained by dividing the whole shaft or the machine into two or more parts and to make the said single parts rotate at speeds differing by a small, predetermined amount, say one to fifteen per cent, means being provided which yieldingly connect the said parts of the shaft. For this purpose, that part of the engine or shaft which corresponds to the "rear" end in a ship may be given a small slip with respect to the "forward" end of the shaft.

This problem may be solved best by transmitting the energy of the fore part to the rear part, not as usual in a direct manner by the contact of rigid parts, but by converting the energy first into another intermediate form of energy, preferably energy due to the flow of a liquid or electric current, namely electrodynamic or hydraulic energy, and then adding the re-converted energy to that of the rear part.

An arrangement for carrying into practice this method of operation consists of a fluid interconnected coupling which, as hereinbefore stated, can be of the electrodynamic or hydraulic type and in which the operative parts are mounted on the respective ends of the shafts. This coupling may for the purpose of the present invention be used, firstly, in order to provide for a certain slight slip between the driving and driven parts and destroy the dynamic co-operation of the several parts of the engine, and secondly, in order thereby to damp to a high degree any remaining oscillations by the resiliency and reaction of the flowing medium (electricity magnetism, fluid or liquid).

In the accompanying drawing, which forms a part of this specification, an embodiment of the invention is represented. In the drawing—

Figure 1:
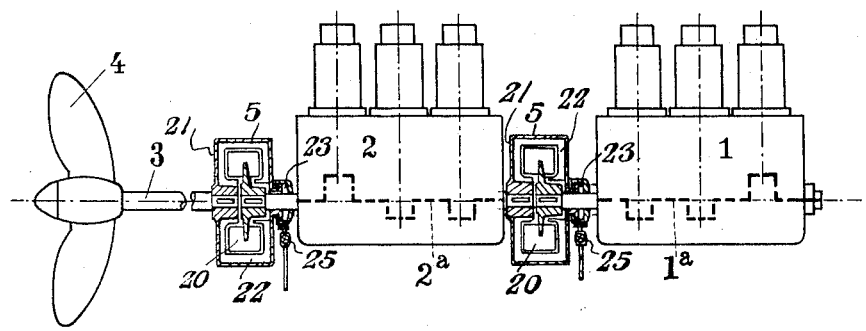
Figure 1 is a diagrammatic illustration of an engine-plant provided with the damping means according to the invention, the latter being shown in section.
Figure 2:
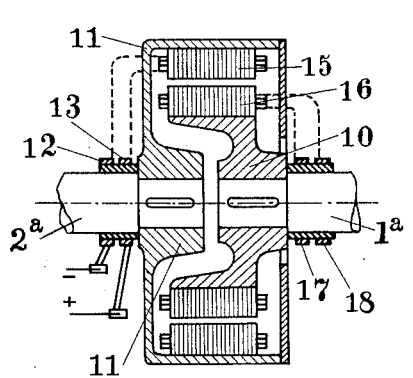
Figure 2 is a sectional view of an electrodynamic coupling, showing the essential operative parts of the appliance.

Referring to Figure 1, 1 and 2 indicate an engine, for instance a Diesel engine, having six cylinders and being divided into simultaneously acting blocks 1 and 2 of three cylinders each, which have different numbers of revolutions. The combined power of both engines is transmitted through a shaft 3 to a driven machine, e. g., a ship-propeller 4. The shaft 1ª of the engine group 1 has a number of revolutions exceeding that of the shaft 2ª of the engine group 2 by a few per cent, for instance 1 to 15 per cent. The transmission of power from the group 1 to the group 2 takes place through a fluid interconnected coupling 5 of any suitable type.

By the described complete separation of the shafts 1ª and 2ª, the possibility of powerful oscillations occurring between these two parts is entirely removed. This is a great advantage over rigid couplings, the possibility of a dangerous resonance being thereby totally removed owing to the difference in the number of revolutions of the engine parts 1 and 2. Indeed, it would be necessary according to well known mechanical laws that parts 1 and 2 should have the same number of revolutions in order to produce resonance effects. It might also be convenient to consider the possibility that certain oscillations of a higher order (harmonic oscillations) between the engine parts 1 and 2 might be increased through the coupling, but such harmonic higher oscillations are rendered uninfluential and inefficient by the selection of an adequate slip. Moreover such oscillations, even if not expressly taken into consideration in the construction of the coupling, would at any rate be damped by the particular kind of transmission.

Obviously the power unit or engine sections may be divided into two or more groups, the powers of such groups or units being transmitted through fluid interconnected couplings such as 5. The individual engine groups or units need not necessarily be of a similar kind, but may advantageously be adapted to varying working conditions and modes of application. For example, the front group or unit may have cylinders of larger size or number than the rear group or unit and may also have a different total power than the rear unit. Further, one or the other of the units need not in itself contribute to the production of power, but may serve some auxiliary purpose. However, the present invention more particularly embodies a principle and construction of hydraulic power transmission means interconnecting the working shafts of engines or other devices for imparting power from the one to the other, rather than any particular type of power unit assembly.

The arrangement for carrying out the new method of damping oscillations may also according to Fig. 1 be carried out by providing a slight difference in the number of revolutions or slip between the rear engine shaft 2ª and the shaft 3 of the propeller 4 by inserting between the shafts 2ª and 3, a fluid interconnected coupling 5 as shown, or by inserting therebetween suitable means of similar type, such for instance as is shown in Fig. 2. This is particularly advantageous in the case of long ship-propeller shafts for the purpose of damping the dangerous torsional oscillations between the engine and the propeller screw.

Figure 3:
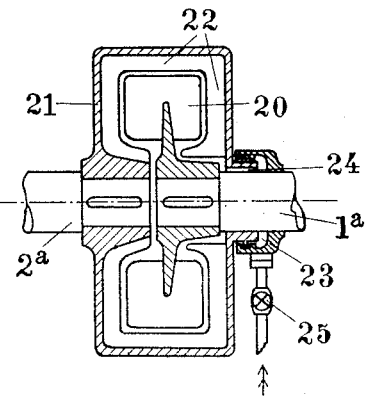
Figure 3 is an enlarged sectional view of a hydraulic coupling.

Figures 2 and 3 show diagrammatically on somewhat enlarged scales examples of fluid interconnected couplings which may conveniently be used for the aforesaid purposes. It is an essential feature of these couplings that they do not possess any stationary reaction parts and consist merely of rotating parts, with the exception eventually of the protecting casings and the parts for supplying the flowing medium or fluid.

Figure 2 shows an electro fluid interconnected coupling consisting of a rotor 10 mounted upon one shaft end, for instance 1ª, and a rotor 11 placed upon the other shaft end, for example 2ª. The coil windings 15 and 16 may be excited by continuous or alternating current, which is supplied by means of rings 12, 13, 17 and 18 and the usual brushes and connections.

Figure 3 is an enlarged representation of the hydraulic coupling members 5 shown in Fig. 1. The illustrated embodiment of the invention is of very simple construction advantageously adaptable to the described use with the present damping arrangement. As shown, the coupling or hydraulic power-transmitting means embodies a rotary element 20 secured on the end of the shaft 1ª, said element comprising enlarged radially disposed blades which act upon or are acted upon by fluid. On the end of the opposing shaft 2ª is shown a rotary element 21 embodying or providing a casing overextending the rotary element 20 on the shaft 1ª and formed or provided with radially disposed ribs or blades 22 conforming to the shape of or extending complementarily around the blades of the rotary element 20 on the shaft 1ª, said ribs or blades being also acted upon by or acting upon fluid within the casing formed by the said cooperable rotary elements, the fluid impelled by the rotary element on the shaft moving at the greater speed acting upon the rotary element on the other shaft to transmit or impart power from the former to the latter with a relative slippage or difference in speeds between the two shafts. That is, owing to the difference in the number of revolutions of the two oppositely ribbed or bladed rotary parts or elements 20 and 21— 22, a more or less regular circulation of the liquid is produced, which transmits the turning moment of one part or shaft to the other part or shaft, without any solid mechanical contact taking place. The more perfect the circulation of the liquid attained, the less will be the dimensions and slippage of the coupling. Fluid for effecting the power-transmission or relative rotation between the two shafts, is admitted through the conduits 23 and 24 and may be regulated by a valve 25.

As the above described fluid interconnected couplings do not contain any parts which are in direct contact, any small lateral or axial movements of the shafts remain uninfluential and inefficient and are likewise damped by the flowing medium. This is particularly the case with rapid lateral and axial oscillations, such as usually occur with crank shafts of rapidly running Diesel engines working under a high load.

The described arrangement has moreover other practical advantages particularly as regards great facility of stopping the engine and cutting out without shock a single group of engines. Such advantages are known and need not be enumerated.

In the foregoing specification two fluid interconnected couplings have been disclosed for the purpose of example, but evidently different constructions may be employed for the connection of the several sections.

What I claim as my invention, and desire to secure by Letters Patent, is—

1. A device for damping the oscillations of crank-shafts, comprising in combination with a plurality of engines operated at relatively different speeds, a coupling interconnected between opposing ends of aligned shafts of engines adjacently arranged, said coupling comprising a rotary element having enlarged radially disposed blades secured on the end of one engine shaft and a cooperable rotary element providing an enclosing casing for said first rotary element having radially disposed ribs or blades conforming to or complementarily overextending the blades of the first rotary element and secured on the opposing end of an adjacent engine shaft, together with means for admitting a fluid into the casing formed by said cooperable rotary elements, by which power under greater velocity movement of one shaft will be imparted to the other shaft with a degree of slippage or relative difference in speeds of shaft rotation.

2. The combination with a plurality of engines having crank-shafts adapted to rotate at relatively different velocities, of hydraulic power-transmission means interconnecting the crank-shafts of adjacent engines for transmitting power from one to another with a degree of slippage preventing resonance or harmonic oscillations therebetween; said means comprising a rotary element having enlarged radially disposed blades secured on an end of the shaft of one engine and a cooperable rotary element encasing said first mentioned rotary element having radially disposed ribs or blades complementarily overextending the blades of said first mentioned rotary element and secured on the opposing end of the shaft of an adjacent engine, together with means for admitting and maintaining a fluid in the casing formed by said cooperable rotary elements by which power under greater velocity movement of one shaft will be imparted to the other shaft with a slippage or relative difference of velocities therebetween.

In testimony whereof I have signed my name to this specification.

HERMANN FÖTTINGER.